United States Patent [19]
Hughes et al.

[11] Patent Number: 6,065,055
[45] Date of Patent: May 16, 2000

[54] INAPPROPRIATE SITE MANAGEMENT SOFTWARE

[76] Inventors: Patrick Alan Hughes, 3717 Kimrod Dr., Johnson City, Tenn. 37601; Paul Blair Elswick, Rte. 3, Box 87A, Jonesville, Va. 24263

[21] Appl. No.: 09/062,637

[22] Filed: Apr. 20, 1998

[51] Int. Cl.[7] ...................................................... G06F 13/00
[52] U.S. Cl. .......................................................... 709/229
[58] Field of Search ...................... 364/DIG. 1, DIG. 2; 707/9; 709/200, 202, 203, 210, 211, 217, 218, 219, 225, 227, 229, 232; 713/200, 201, 202

[56] References Cited

U.S. PATENT DOCUMENTS

| | | | |
|---|---|---|---|
| 4,652,990 | 3/1987 | Pailen et al. | 380/4 |
| 4,745,559 | 5/1988 | Willis et al. | 705/37 |
| 4,791,565 | 12/1988 | Dunham et al. | 713/200 |
| 5,263,157 | 11/1993 | Janis | 707/9 |
| 5,339,403 | 8/1994 | Parker | 711/221 |
| 5,375,244 | 12/1994 | McNair | 710/200 |
| 5,388,211 | 2/1995 | Hornbuckle | 364/260 |
| 5,479,612 | 12/1995 | Kenton et al. | 713/200 |
| 5,627,967 | 5/1997 | Dauerer et al. | 713/202 |
| 5,675,782 | 10/1997 | Montague et al. | 713/201 |
| 5,678,041 | 10/1997 | Baker et al. | 707/9 |
| 5,696,898 | 12/1997 | Baker et al. | 713/201 |
| 5,884,033 | 3/1999 | Duvall et al. | 709/206 |

OTHER PUBLICATIONS

The Internet Filter, Bob Turner, "The Internet Filter," Mar. 11, 1998, 6 pages, http://www.turnercom.com/press1.html, http://turnercom.com/list.

The Cyber Patrol Fact Sheet, The Learning Company, "The Cyber Patrol Fact Sheet," Mar. 11, 1998, 3 pages, http://www.cyberpatrol.com/fact.html.

Cybersitter, Solid Oak Software, Inc., "Cybersitter Product Information," Mar. 11, 1998, 2 pages, http://www.cybersitter.com/cysitter.htm.

Net Nanny Software, Netnanny Software International, Inc., "All About Net Nanny," Mar. 11, 1998, 2 pages, http://www.netnanny.com/allabout.htm.

Surfwatch, Sequel Technology, "Proserver for Microsoft Proxy Server," Mar. 11, 1998, 3 pages, http://www1.surfwatch.com/datasheets/proserver–microsoft/index.html.

CNN Article, CNN & Reuters, "FBI to Parents: Internet pedophiles a serious threat," Mar. 11, 1998, 4 pages, http://cnn.com/TECH/computing/9803/11/cyber.stalking/index.html.

*Primary Examiner*—Robert B. Harrell
*Attorney, Agent, or Firm*—Hunton & Williams

[57] ABSTRACT

A method and system for controlling access to a database, such as the Internet. Said system is optimized for networks and works with a proxy server. Undesirable content from the World Wide Web (WWW) is filtered through a primary "Filter List" and is further aided by a Uniform Resource Locator keyword search. Depending on the threshold sensitivity setting which is adjusted by the administrator, a certain frequency of attempts to access restricted material will result in a message being sent to an authority figure.

10 Claims, 12 Drawing Sheets

| FILTER HIT SUMMARY | | |
|---|---|---|
| DATE - HOUR | CLIENT IP ADDR. | HITS |
| 08/21/1997 - 16 | 10.1.1.11 | 3 |
| 08/21/1997 - 12 | 10.1.1.11 | 2 |
| 08/21/1997 - 15 | 10.1.1.11 | 40 |
| 08/27/1997 - 07 | 10.1.1.11 | 1 |
| 08/26/1997 - 14 | 10.1.1.13 | 2 |
| 08/27/1997 - 15 | 10.1.1.13 | 6 |
| 08/27/1997 - 11 | 10.1.1.14 | 3 |
| 08/22/1997 - 12 | 10.1.1.15 | 5 |
| 08/21/1997 - 12 | 10.1.1.15 | 4 |
| 08/26/1997 - 15 | 10.1.1.21 | 1 |
| 08/25/1997 - 15 | 10.2.1.17 | 8 |
| 08/27/1997 - 13 | 10.2.1.22 | 1 |
| 08/25/1997 - 13 | 10.2.1.22 | 2 |
| 08/26/1997 - 13 | 10.2.1.25 | 1 |
| 08/25/1997 - 11 | 10.2.1.25 | 1 |
| 08/25/1997 - 11 | 10.2.1.26 | 2 |
| 08/26/1997 - 11 | 10.2.1.26 | 1 |

ZOOM SPAN IN MINUTES [15]    CLOSE

FIG. 14

| FILTER HIT SUMMARY | | |
|---|---|---|
| DATE - HOUR | CLIENT IP ADDR. | HITS |
| 08/21/1997 - 15 | 10.1.1.11 | 40 |
| 08/27/1997 - 14 | 10.7.1.15 | 9 |
| 08/25/1997 - 15 | 10.2.1.17 | 8 |
| 08/26/1997 - 11 | 10.5.1.18 | 6 |
| 08/27/1997 - 15 | 10.1.1.13 | 6 |
| 08/26/1997 - 10 | 10.2.1.27 | 5 |
| 08/27/1997 - 14 | 10.4.1.13 | 5 |
| 08/22/1997 - 14 | 10.6.1.31 | 5 |
| 08/22/1997 - 12 | 10.1.1.15 | 5 |
| 08/27/1997 - 15 | 10.4.1.13 | 4 |
| 08/21/1997 - 12 | 10.1.1.15 | 4 |
| 08/21/1997 - 16 | 10.1.1.11 | 3 |
| 08/26/1997 - 10 | 10.6.1.24 | 3 |
| 08/21/1997 - 08 | 10.3.1.14 | 3 |
| 08/21/1997 - 07 | 10.6.1.33 | 3 |
| 08/21/1997 - 13 | 10.6.1.33 | 3 |
| 08/21/1997 - 09 | 10.3.1.21 | 3 |

ZOOM SPAN IN MINUTES [15]    CLOSE

FIG. 15

| ZOOM PROXY LOG | | | | BLOCK — UNBLOCK | | |
|---|---|---|---|---|---|---|
| ▷CLIENT IP | DATE/TIME | STATUS | HOST NAME | | | URL |
| 10.1.1.44 | 8/20/97 2:00:09 PM | OK | www.art21.com | × | ✓ | http://www.art21.com/HTML/IMAGESa21-q302.gif |
| 10.1.1.44 | 8/20/97 2:00:09 PM | OK | www.art21.com | × | ✓ | http://www.art21.com/HTML/IMAGES/HAND-R.gif |
| 10.1.1.44 | 8/20/97 2:00:08 PM | OK | www.art21.com | × | ✓ | http://www.art21.com/ |
| 10.1.1.44 | 8/20/97 1:59:06 PM | BLOCK | - | × | ✓ | http://www.hotwired.com/cgi-bin/redirect/128/http://www.h |
| 10.1.1.44 | 8/20/97 1:59:05 PM | OK | me1.hotbot.com | × | ✓ | http://www.hotbot.com/clickthru.html?_id=1604&_h=1002Aty |
| 10.1.1.44 | 8/20/97 1:58:38 PM | BLOCK | - | × | ✓ | http://www.xxxratedsex.com/ |
| 10.1.1.44 | 8/20/97 1:58:15 PM | BLOCK | - | × | ✓ | http://bulldog.sexhound./com?code=20554 |
| 10.1.1.44 | 8/20/97 1:58:15 PM | BLOCK | - | × | ✓ | http://w16.hitbox.com/wc/C23921335.cgi |
| 10.1.1.44 | 8/20/97 1:58:08 PM | BLOCK | - | × | ✓ | http://bulldog.sexhound./com?code=20554 |
| 10.1.1.44 | 8/20/97 1:58:08 PM | BLOCK | - | × | ✓ | http://w16.hitbox.com/wc/C23921335.cgi |
| 10.1.1.44 | 8/20/97 1:57:44 PM | OK | www.sex4all.com | × | ✓ | http://207.107.107.233/track.cgi?qpage |
| 10.1.1.44 | 8/20/97 1:57:44 PM | BLOCK | - | × | ✓ | http://bulldog.sexhound.com/?code=20554 |
| 10.1.1.44 | 8/20/97 1:57:44 PM | BLOCK | - | × | ✓ | http://w16.hitbox.com/wc/C23921335.cgi |
| 10.1.1.44 | 8/20/97 1:57:41 PM | BLOCK | - | × | ✓ | http://w16.hitbox.com/wc/C23921335.cgi |
| 10.1.1.44 | 8/20/97 1:57:41 PM | OK | www.sex4all.com | × | ✓ | http://207.107.107.233/track.cgi?qpage |
| 10.1.1.44 | 8/20/97 1:57:41 PM | BLOCK | - | × | ✓ | http://bulldog.sexhound.com/?code=20554 |

FIG. 16

| ZOOM PROXY LOG | | | | BLOCK — UNBLOCK | | |
|---|---|---|---|---|---|---|
| ▷MACHINE | DATE/TIME | STATUS | HOST NAME | | | URL |
| BEVERLY | 8/21/97 4:14:47 PM | OK | - | × | ✓ | - |
| BEVERLY | 8/21/97 4:14:38 PM | OK | www.eb.com | × | ✓ | http://www.eb.com:180/cgi-bin/g?DocF=index/ti/ger/21.htm |
| BEVERLY | 8/21/97 4:14:28 PM | OK | bastion.eb.com | × | ✓ | http://bastion.eb.com/picons/id_index.gif |
| BEVERLY | 8/21/97 4:14:25 PM | OK | www.eb.com | × | ✓ | http://www.eb.com:180/cgi-bin/g?DocF=micro/594/24.html |
| BEVERLY | 8/21/97 4:14:16 PM | OK | www.eb.com | × | ✓ | http://www.eb.com:180/cgi-bin/g?DocF=micro/262/69.html |
| BEVERLY | 8/21/97 4:14:16 PM | OK | bastion.eb.com | × | ✓ | http://bastion.eb.com/picons/id_micro.gif |
| BEVERLY | 8/21/97 4:14:08 PM | OK | www.eb.com | × | ✓ | http://www.eb.com:180/thumbs/ob5envr001m4.gif |
| BEVERLY | 8/21/97 4:14:08 PM | OK | bastion.eb.com | × | ✓ | http://bastion.eb.com/picons/hittop.gif |
| BEVERLY | 8/21/97 4:14:08 PM | OK | bastion.eb.com | × | ✓ | http://bastion.eb.com/picons/arrow.gif |
| BEVERLY | 8/21/97 4:14:08 PM | OK | bastion.eb.com | × | ✓ | http://bastion.eb.com/picons/id_.gif |
| BEVERLY | 8/21/97 4:14:08 PM | OK | www.eb.com | × | ✓ | http://www.eb.com:180/cgi-bin/g?keywords=tiger&hits=108 |
| BEVERLY | 8/21/97 4:14:07 PM | OK | bastion.eb.com | × | ✓ | http://bastion.eb.com/picons/resbl2.gif |
| BEVERLY | 8/21/97 4:14:07 PM | OK | bastion.eb.com | × | ✓ | http://bastion.eb.com/picons/bg-.gif |
| BEVERLY | 8/21/97 4:13:59 PM | OK | bastion.eb.com | × | ✓ | http://bastion.eb.com/picons/rerefr.gif |
| BEVERLY | 8/21/97 4:13:59 PM | OK | bastion.eb.com | × | ✓ | http://bastion.eb.com/picons/refeat.gif |
| BEVERLY | 8/21/97 4:13:58 PM | OK | bastion.eb.com | × | ✓ | http://bastion.eb.com/picons/remorer.gif |

FIG. 17

INAPPROPRIATE SITE MANAGEMENT SOFTWARE

FIELD OF THE INVENTION

The invention relates to methods of controlling user access to a network or database, particularly the Internet, by means of content blocking and in case of attempts to circumvent said control access, notification to an appropriate supervisor, such as a system administrator. The present invention is designed to monitor Internet access on networks, both Wide Area Networks and Local Area Networks.

BACKGROUND OF THE INVENTION

The Internet is a vast collection of resources from around the world with no sort of "central" or main database. Instead it is a collection of thousands of computers, each with their own individual properties and content, linked to a network which is in turn liked to other networks. Many of these computers have documents written in the Hypertext Mark-up Language ("HTML") that are publicly viewable. These HTML documents that are available for public use on the Internet are commonly referred to as "Web Pages". All of the computers that host web pages comprise what is known today as the World Wide Web ("WWW").

The WWW is comprised of an extremely large number of web pages that is growing at an exponential amount every day. A naming convention known as a Uniform Resource Locator ("URL") is used to designate every web page on the Internet. Web pages are typically assigned to the subclass known as the Hypertext Transport Protocol ("http") while other subclasses exist for file servers, information servers, and other machines present on the Internet. URLs are an important part of the Internet in that they are responsible for locating a web page and hence, for locating desired information. "Linking" is another method of providing URLs to an Internet user. When the user accesses any given URL, other "links" to further URLs may be present on the web page. This expanding directory structure is seemingly infinite and can result in a single user seeking one web page, to compile a list of hundreds of new web pages that were previously unknown.

Large amounts of information are available on the WWW and are easily accessible by anyone who has Internet access. In many situations it is desirable to limit the amount and type of information that certain individuals are permitted to retrieve. For example, in an educational setting it may be undesirable for the students to view pornographic or violent content while using the WWW.

Until now, schools have either ignored inappropriate material available on the Internet or attempted to filter it with software originally designed for home use on a single computer, while others have tried to convert their filtering products to proxy servers so that they may filter entire networks. "Yes Lists" and "Content Filtering" are other industry methods, which have found use in this area, albeit with less success. Conventional "filtering" has several inherent flaws, despite the fact that it is considered the best alternative of inappropriate site management. If a filter list is broad enough to ensure complete safety for its users, unthreatening material is inevitably filtered along with material considered to be appropriate. This leads to a reduction in the versatility of the Internet and the possibility of censorship accusations. On the other hand, if the filter list is too narrow, inappropriate material is more likely to pass through to the users. In addition, the filter vendor is in control of defining the filter list. This results in the moral and ethical standards of the vendor being imposed upon the user. All this, combined with the speed at which inappropriate sites appear on the Internet, and the Internet search engines' tendency to present newer web sites first, the sites least likely to be in filter list tend to be most likely to appear at the top of search results.

A "Yes List" is the safest method of protecting students on the Internet. However, it is the most expensive to administer, and it dramatically reduces the benefits of the Internet in an educational setting by being the most restrictive. "Yes Lists" require the teachers to research the Internet for materials they wish students to have access to, then submit the list of suitable materials to an administrator. The administrator then unblocks these sites for students access, leaving all non-approved sites fully blocked and non-accessible.

The final method of managing inappropriate material is "Content Filtering". This involves scanning the actual materials (not the URL) inbound to a network from the Internet. Word lists and phrase pattern matching techniques are used to determine if the material is inappropriate or not. This process requires a great deal of computer processor time and power, slowing down Internet access and also making this a very expensive alternative. Furthermore, it is easily defeated by pictures, Java, or some other method of presenting words/content without the actual use of fonts.

These and other drawbacks exist.

SUMMARY OF THE INVENTION

An object of the invention is to overcome these and other drawbacks in existing devices.

The present invention circumvents the current lack of administrative intervention by notifying a system administrator when a user repeatedly attempts to bypass security measures that have been placed to restrict viewing of inappropriate material. The software is designed to protect an entire computer network. The software is placed on the server used as the interface to the Internet. This machine may be a proxy server on any machine capable of running Windows NT 4.0 or greater. The computing power of the machine needed is dependent on the number of users in the system. A system with only a few hundred users will have different requirements than a system with thousands of users. All machines that are to be used with Microsoft Proxy Server 2.0 or greater should be built according to the minimum requirements designated by Microsoft. The software uses an activity log that may be generated by a proxy server or firewall system. Chaperon does among other things, a statistical analysis of an activity log to alert administrators of attempts to circumnavigate a filter list.

A proxy server can serve five functions: 1. A firewall. 2. Generates an activity log. 3. Acts as an agent for all clients on a network, to the Internet. 4. Allows private I/P addresses to be used on a network to identify client machines, reducing the administration effort needed to manage and register public I/P addresses. This also enhances the firewall. 5. The proxy server also caches Internet activity, improving the efficiency of the data acquisition from the Internet.

A local area network (LAN) is usually a group of computers on the same campus or property, sharing a common communication connection. Another connection from the Internet, (which is a wide area network or WAN) may or may not be present.

A firewall is either software, hardware, or combination of the two, and is designed to keep intruders (hackers) from accessing information on a network that they are not authorized to access. These intruders generally try to gain access to the private network via the Internet connection or dial into the network via modems.

Security measures as related to a firewall would consist solely of a proxy server connected to the network. The proxy server splits the network into two distinct segments. One segment consists of computers on the secure segment (inside) and the other consists of computers on the insecure segment (outside, or Internet). The only route from the secure network segment to the insecure segment is through the proxy server. The proxy server is connected to both network segments simultaneously.

The present invention currently runs on Microsoft Windows NT 4.0 or greater and requires Microsoft Proxy Server 2.0 or greater to operate. This is not to say that it cannot be implemented on other operating systems that generate a log of network activity. Chaperon does not affect network operation other than the material it prevents from being accessed. It utilizes email and popup windows as a means of notification, with other methods such as pager notification also being feasible.

The present invention is designed in two modules. The first module is a program that runs on Windows NT 4.0 or greater, but is started as a service and requires Microsoft Proxy Server 2.0 or greater. This server is placed in a physical location on the network to be protected, so it can isolate the network from the public Internet (See FIG. 1).

This program does various operations on the log file that Microsoft Proxy Server generates, at predetermined intervals. This module is approximately a 5-megabyte download to the client and provides the notifications and blocking features.

Module 1 is written in Visual Basic and runs as a service on Windows NT 4.0 or greater so it can run in the background and minimize the computer resources required for operation. Module 1 operates using the proxy server log in a preset window of time. This time window is defined by the Chaperon administrator and is referred to as the "Scan Interval" (see FIG. 10). The administrator should define this window to coincide with the expected length of an Internet session by the average user. A typical time window for K-12 schools is 15 minutes. Another time window exists and is called the notification interval, which is also set by the administrator (see FIG. 10). If the notification interval is set to a time less than the scan interval, all actions herein described that take place at the end of the scan interval, with the exception of resetting the base time marker, revert to happening at the end of the notification interval. Because the base time marker does not reset at the end of the notification interval, data is reconsidered during the next notification interval, accounting for the duplicate notifications if the notification interval is less than the scan interval. This accounts for some duplicate notifications that occur with that configuration.

At the end of the scan interval, module 1 adds the number of attempts to access blocked material, by user, to a running total of attempts carried since the totals were reset. Module 1 also increments a running total of filter hits for each user. Module 1 then calculates a running average by dividing the total number of filter hits by the total number of users. This is the average hits per user. As each users statistics are added to the totals used to compute the running average, the number of hits for that user is compared to the running average computed at the end of the last scan interval. If the user's total filter hits exceed a predefined threshold, a notification is generated and stored. The administrator, using the slide feature on the configuration menu sets this threshold factor (see FIG. 10). A sensitivity setting of "High" sets the threshold factor so low that any filter hit will generate a notification of an inappropriate site access attempt. A sensitivity setting of "Low" would require the number of hits by one user to be around 4000% of the average. The default setting at program startup for the threshold factor is approximately 400%. The stored notifications are broadcast at the end of each notification period.

This averaging method is not the ideal method of triggering a notification message. The ideal method is a true standard deviation calculation with the predetermined threshold being a standard deviation figure. Unfortunately, this method is not practical in an application developed using Microsoft Access database. Access does not allow a query within a query, which is a requirement for calculating a running standard deviation. If this application were implemented using Microsoft SQL Server or other database engine, a query within a query is allowed, hence the true standard deviation method would be practical to implement.

When the program is beginning with very few users, a small number of filter hits, or a near zero running average the above algorithm could be unreliable. To compensate for this potential difficulty, another trigger for a notification message is to use the slider bar value to specify a number of hits per minute (hits/minute versus hits/user). Because the number of filter hits per minute is set by the same slider bar (See FIG. 10), the number of filter hits to trigger a notification will be in proportion to the percentage multiple that the slider sets for the averaging method. The program takes the number of filter hits per client for the scan internal and divides it by the number of minutes in the scan interval to get a number of hits per minute per client. If this hit rate is higher than the slider bar value, a notification is sent. This message generation technique is useful when the program first starts and has yet to determine an average baseline. At the default setting, the slider bar value would be approximately 4 hits per minute. This is high enough as to prevent accidentally triggering on anyone but the most determined user (i.e. For a 15 minute scan interval, it takes 60 filter hits to trigger a notification, this large of a number would be unheard of for inadvertent hits). This is OK, since the program flushes the baseline average at about 1:00 am. In most school settings, anyone using the computer during this time frame would be one of a very few users (hence the averaging method wouldn't work anyway) and very likely is a user determined to find inappropriate material anyway. As experience is gained, these methods are adjusted to compensate for the improvement in the understanding of the problem.

The next method of initiating a notification message is URL Scanning. URL scanning looks for keywords, phrases and pattern recognition within the URL as it is handled by the proxy server. Keyword and phrase recognition is used to detect the search terms in the log on a 3-second timer cycle. If a match is detected, a notification is generated and stored. An example of this is the following Yahoo search request:

http://search.yahoo.com/bin/search?p=naked+women

Pattern recognition is also used to determine when the user has entered an index of one of the major search engines that catalogs inappropriate material. This is done on a 3-second timer also. If a match is detected, a notification is generated and stored. An example of this is the following URL:

http://www.yahoo.com/Business_and_Economy/Companies/Sex/Virtual_Clubs/

Any stored notifications are broadcast on a 15-second time period.

The notifications that are initiated by the above methods, are usually, but not limited to E-mail, Pop-up notifications, and Paging. When notifications are triggered, they are stored until the notification interval is complete, with the exception of URL pattern matching. Filter hits exceeding the threshold limit notifications are broadcast at the end of each notification interval; however, notifications generated by URL word, phrase, or pattern matching are broadcast every 15 seconds. At those times the stored notifications are executed and deleted. The next notification interval begins. The length of the notification interval is set by the administrator on the Proxy Monitor panel as illustrated in FIG. 10. The administrator can configure various notification structures. The "Notify on Events" and "CC on Events" field is used to specify what email addresses an email is sent to in the event a notification message is triggered anywhere in the protected network. In the Advanced settings panel, email and popup notifications can be specified by I/P address netmasks, using global characters. This feature is useful if an administrator is distributing the administrative duties to various people at different locations on the network.

BRIEF DESCRIPTION OF THE DRAWINGS

FIG. 14 is the Filter Hit Summary sorted by user IP address, which should indicate the location of the machine on the network.

FIG. 15 is the Filter Hit Summary sorted by the total number of hits per user per date-hour.

FIG. 16 is the Zoom Proxy Log which shows the actual activity on the Internet of the selected user.

FIG. 17 shows the client IP in the Zoom Proxy Log by displaying the user name if Microsoft Windows NT is used to authenicate security on the network.

DETAILED DESCRIPTION OF THE PREFERRED EMBODIMENTS

Figure 2:
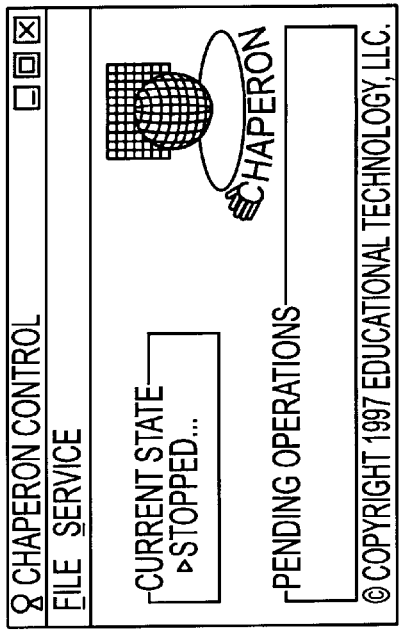
FIG. 2 is an illustration of the invention's control panel that displays the current state of the service.

The present invention's control panel is shown in FIG. 2. The invention runs as a service on Microsoft Windows NT 4.0 or greater. It's control panel displays the Current State of the service. This includes stopped, running, stopping, and starting. Also displayed are any Pending Operations. Any commands that have been requested and are awaiting their turn to execute will be displayed under Pending Operations.

Figure 3:
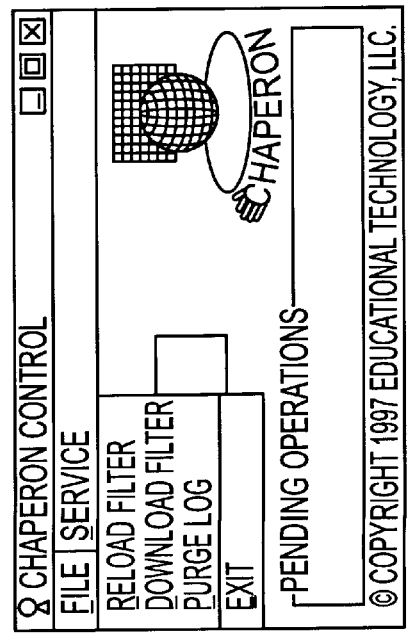
FIG. 3 is an illustration of the file dropdown menu in the control panel.
Figure 9:
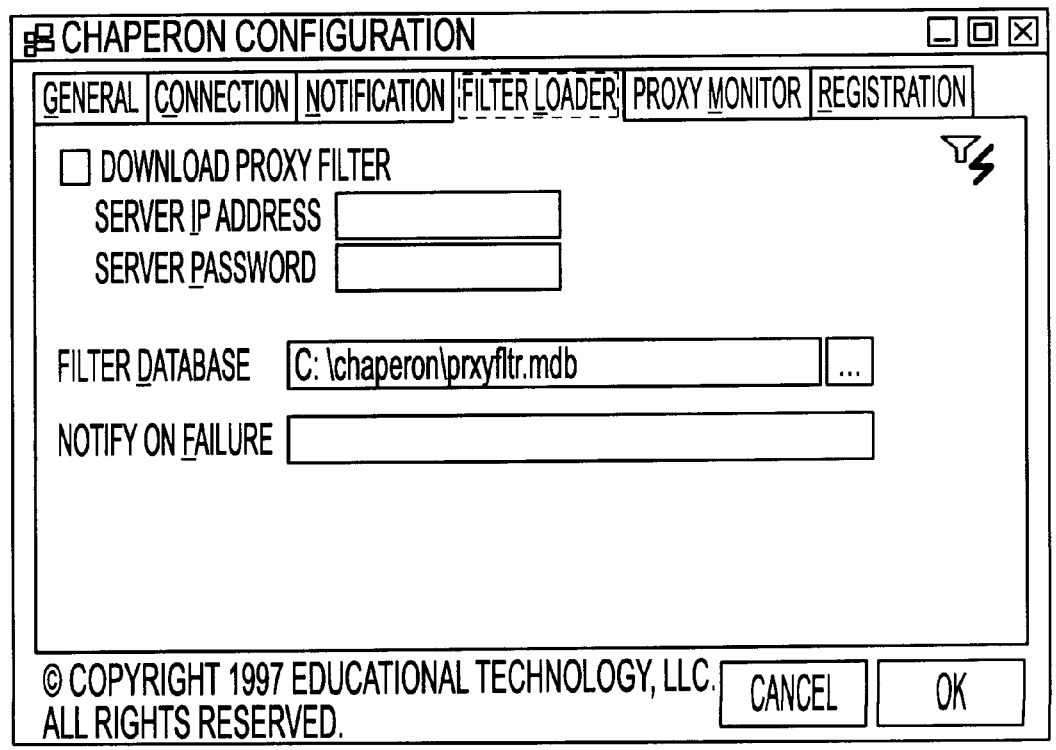
FIG. 9 is an illustration of the filter loader tab which specifies information about where to obtain filters.

FIG. 3 illustrates the File dropdown menu. Options include Reload Filter, Download Filter, and Purge Log. In the event that a manual update of the filter list is desired, the adminiatrator will select the Download Filter command first. This will instruct the program to go to a predefined web server (See FIG. 9) and download the latest filter list. Normally, this has been done automatically and daily by the invention. Once the download is completed, the Reload Filter command is selected. This will stop the service on Microsoft Windows NT, merge the new filter list with the local exception list, reload the filter list into the proxy server registry, and restart the service on Microsoft Windows NT.

Ocasionally, the Proxy Server log file will become too large for the hardware components to handle. This could result from too long of a history being specified on the Configuration/General tab (See FIG. 6). This would result in a proxy log file that is too large for the hardware platform to manipulate. The Purge Log command can be used to reduce the size of this file. The Purge Log command will stop the service on Microsoft Windows NT, reduce the size of the proxy log file to the number of days specified on the Configuration/Proxy Monitor tab, and restart the Microsoft Windows NT service.

Figure 4:
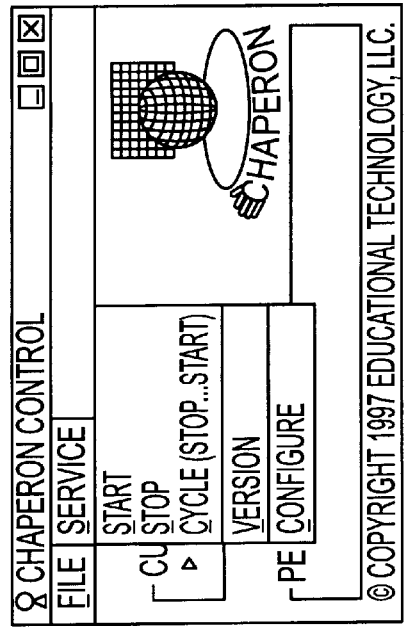
FIG. 4 is an illustration of the Service dropdown menu in the control panel.
Figure 1:
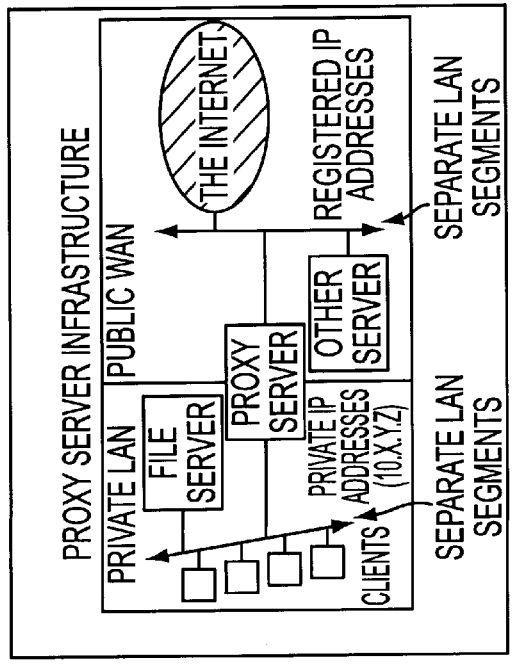
FIG. 1 is an illustration of a Proxy Server Infrastructure.

The present Invention's Service dropdown menu (See FIG. 4) includes the manual Start, manual Stop, the Cycle command (which is an automatic Stop and Restrart sequence), Version information, and Configure tab dialog box.

The manual Start and Stop commands, start and stop the service on the Microsoft Windows NT server, respectfully. Whenever any configuration changes are made, the service on Microsoft Windows NT has to be stopped and started to make those changes effective. To facilitate this, the Cycle command should be used. It will automaticly stop and restart the service to activate configuation changes.

Figure 5:
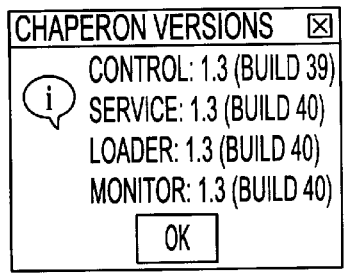
FIG. 5 is an illustration of the version command screen that displays the software version and build numbers.

The Version command will activate a screen (See FIG. 5) that displays the software version and build identification numbers.

Figure 6:
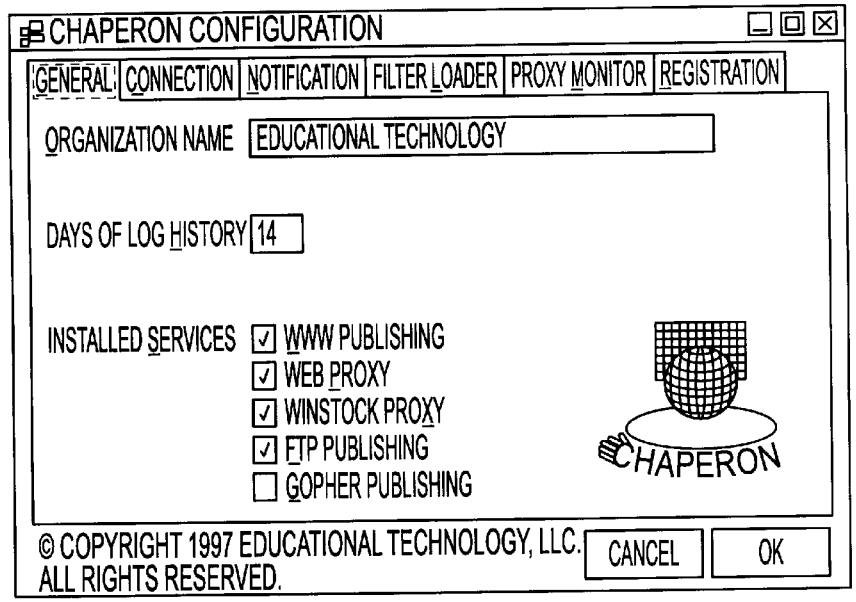
FIG. 6 is an illustration of the configuration tab dialog box that includes the general, connection, notification, filter loader, proxy monitor, and registration tabs.

The present invention's Configuration command displays a Tab Dialog Box (See FIG. 6). There are six tabs, labeled general connection, notification, filter loader, proxy monitor, and registration. The General tab records the organization name, how many days of the proxy log is kept before purging. It also defines what services are installed on the proxy server. This tab also contains a password entry field and a password verification field. If entries are made into these fields, the ability to reconfigure Chaperon becomes password protected, if left empty, the configuration menus are not protected.

Figure 7:
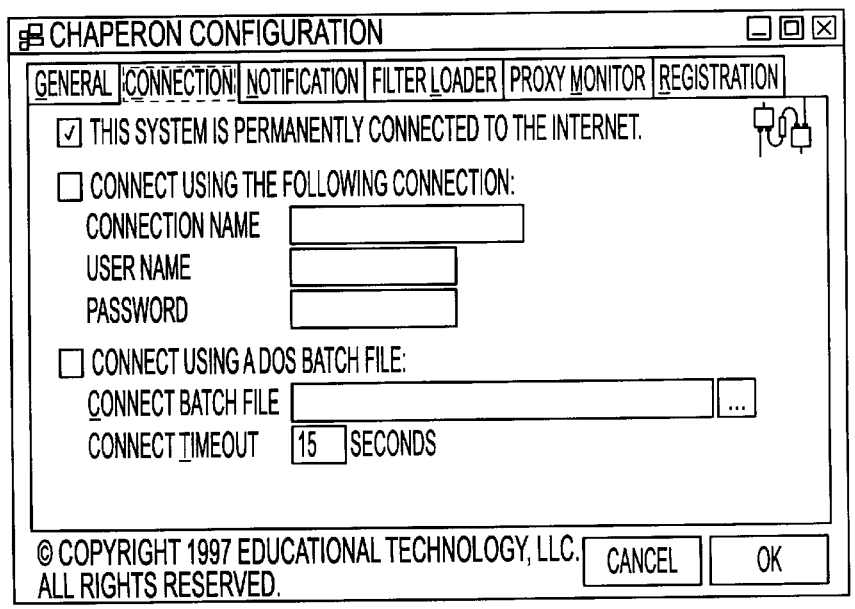
FIG. 7 is an illustration of the connection tab that defines what type of connection the proxy server is using to connect to the Internet.

FIG. 7 illustrates the Connection tab. The Connection tab defines what type of connection that the proxy server is using to connect to the Internet. This information is needed when the download of the revised filter list is initiated nightly. Three methods of connection can be defined; a permanent connection, dial-up connection using Remote Access Service, or dial-up using a batch file. When the program determines it is time to connect to the Internet, it notifies the proxy server to establish a connection via the appropriate method.

Figure 8:
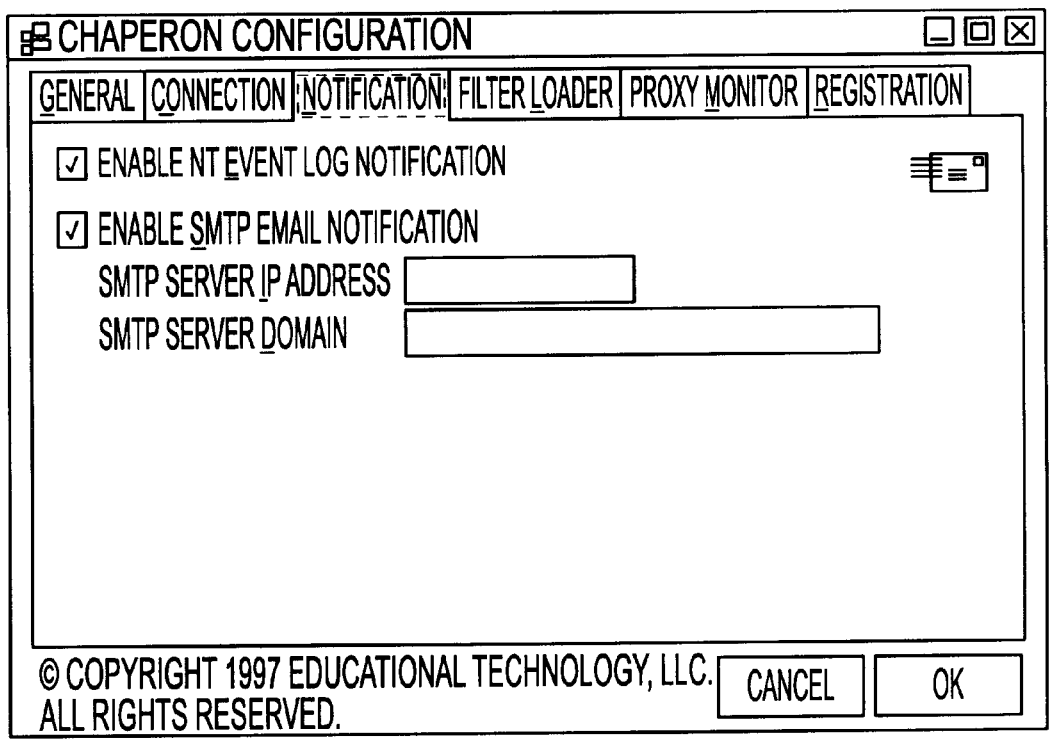
FIG. 8 is an illustration of the notification tab whose function is to set up the invention's notification feature.

The Notification tab (See FIG. 8) sets up the notification feature. NT event log notification can be enabled or disabled on this menu. Email notification can also be enabled and disabled here. If email notification is enabled, a SMTP server IP address and SMTP server domain must be specified.

The Filter Loader tab (See FIG. 9) specifies information about where to obtain a revised filter, where it is located on the local machine, and who to notify if the automated filter download fails. The nightly download feature can be enabled or disabled on this menu. The server's IP address that has the filter list to be downloaded and the required password is defined on this menu. If the filter list download fails, the email address of the person to be notified is also stored here.

Figure 11:
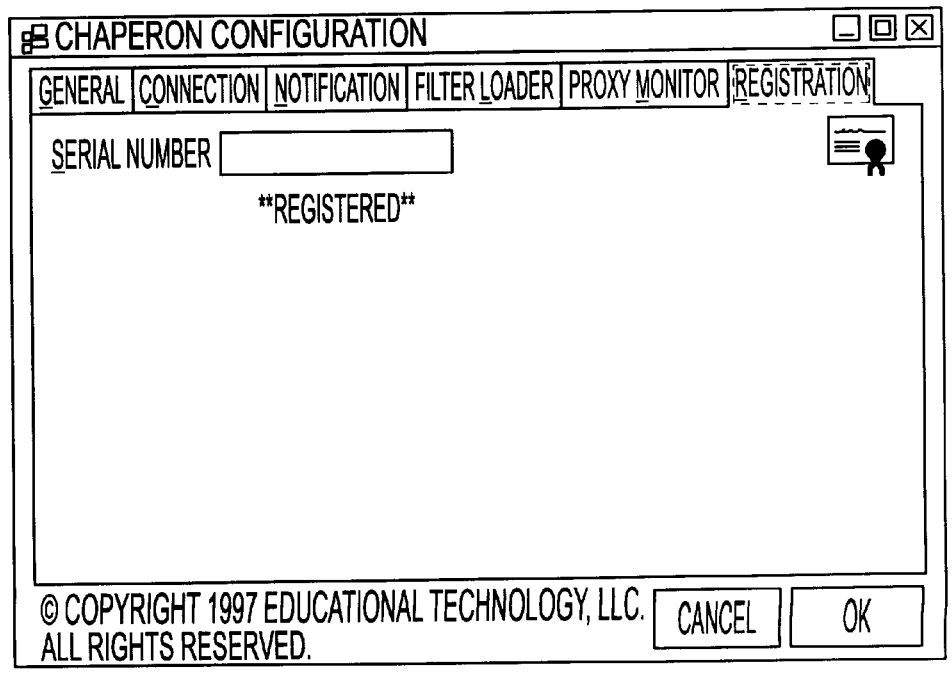
FIG. 11 is an illustration of the registration tab which displays the product serial number and designates proper ownership.

The Registration tab (See FIG. 11) displays the product serial number. An acknowledgement of proper product registration is displayed here.

Figures 12, 13:
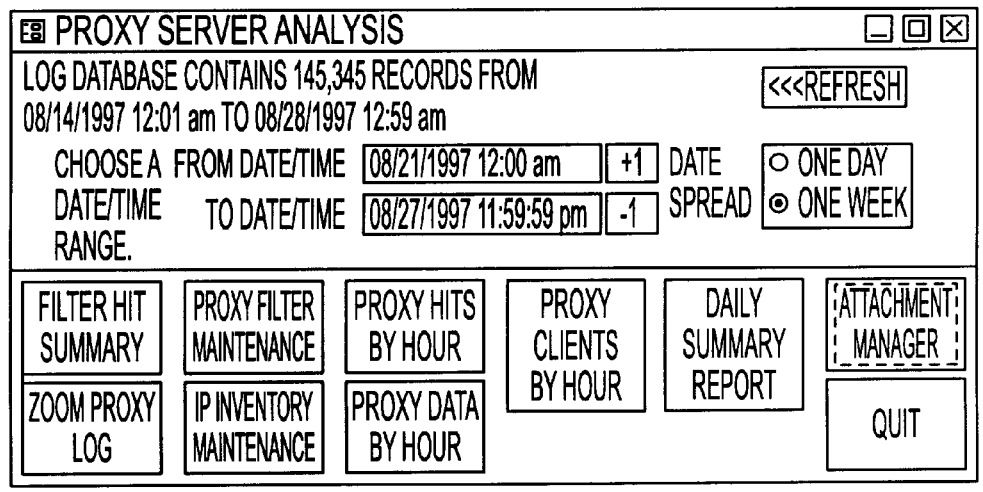
FIG. 12 is the Proxy Server Analysis menu of module 2.
FIG. 13 is initial Filter Hit Summary display that shows the number of filter hits per client, per date-hour.

FIG. 12 is the Proxy Server Analysis menu of module 2. Starting at the top left hand side of the menu, the number of records contained in the current log file and the start and end date/time is displayed. Since the log is continually recording Internet activity, the administrator can select the REFRESH button at the upper right side of the menu to get the latest statistics displayed on the menu.

Just below the REFRESH button the administrator can select what time period they wish to investigate. This DATE SPREAD can be either a single day or week. To the left of the DATE SPREAD are the fields that indicate the exact starting date/time to be selected. The +1 and −1 keys allow the time period to be moved in either one day or one-week increments, forward or backward.

Below the date/time range controls are six buttons that activate various functions. These include FILTER HIT SUMMARY, PROXY FILTER MAINTENANCE, PROXY HITS BY THE HOUR graph, PROXY CLIENTS BY THE HOUR graph, DAILY SUMMARY REPORT, and the ATTACHMENT MANAGER. Further down are four more buttons, including ZOOM PROXY LOG utility, IP INVENTORY MAINTENANCE, PROXY DATA BY THE HOUR graph, and the QUIT buttons.

The initial Filter Hit Summary display is shown in FIG. 13. In general the display shows the number of filter hits per client, per date-hour. The filter hit summary display has three columns. The first column is the date-hour. The second column is the Client IP Address. This is the IP address of the user's computer. The last column being the total number of filter Hits per date-hour. The data in this display can be sorted by clicking on the column headings, as illustrated in FIG. 14 and 15.

FIG. 14 is sorted by user IP address, which should indicate the location of the machine on the network, and FIG. 15 is sorted by the total number of hits per user per date-hour. This display is very helpful even without the notification feature of module 1. As you can see, it is obvious which users have hit the filter list with a disproportionate frequency. According to Chaperon's inappropriate site manangement philosophy, this is a primary indicator of deliberate inappropriate site access.

By clicking on the arrow button coinciding with the user the administrator would like to investigate, to the right of the filter Hits column, the Zoom Proxy Log display appears (See FIG. 16)

This display shows the actual activity on the Internet of the selected user. The time frame displayed is determined by the time of the first filter hit durning the selected Date/Time minus the Zoom Time in Minutes to the last filter hit of the selected Date/Time plus the Zoom Time in Minutes. By clicking on the column heading Client IP, the user name will appear if Microsoft Windows NT is used to authenicate security on the network (See FIG. 17). If another security authenication or no security is used, the IP address of the user's machine will appear. The IP Inventory Maintenance feature is used to translate these IP addresses to usable names or locations in the event that Microsoft Windows NT security is not implemented. If no security is used or another security other than Microsoft NT is used, static IP addresses or long term leasing of DHCP addresses will be necessary for the network to facilitate locating incidents.

The status column displays whether the site was viewed by the user or blocked from viewing (See FIG. 16). The red Block x and the green Unblock checkmark allow sites that are not blocked to be added to the filter list or in the case of Unblock, to release a site for viewing. These changes are local in nature and do not affect the master filter list for other subscribers.

Figures 18, 19:
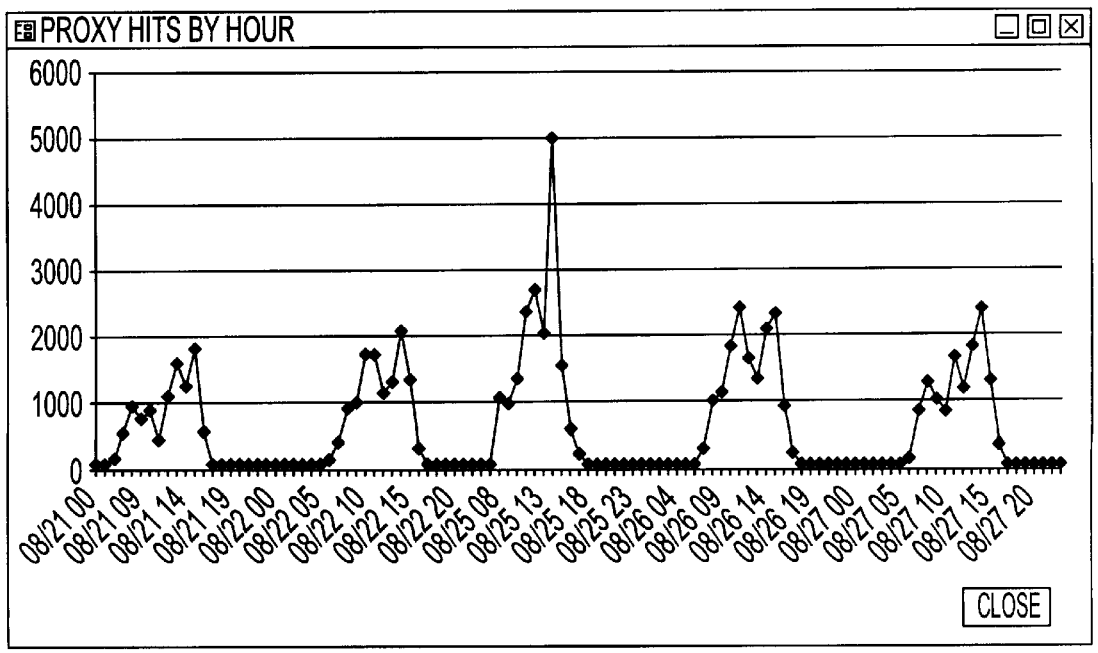
FIG. 18 is the PROXY FILTER MAINTENANCE display which allows the user to define domains or IP addresses that they wish to either block or display.
FIG. 19 is the PROXY HITS BY THE HOUR graph which displays the number of web pages successfully accessed by the proxy server.

The PROXY FILTER MAINTENANCE (See FIG. 18) display allows the user to define domains or IP addresses that they wish to either block or display, overriding the master filter list distributed by the vendor. Important . . . It is important to note that these override settings do not take effect until the filter list is reloaded.

The PROXY HITS BY THE HOUR graph (See FIG. 19) displays the number of web pages successfully obtained in thousands by the proxy server versus the Date/Hour.

Figures 20, 21:
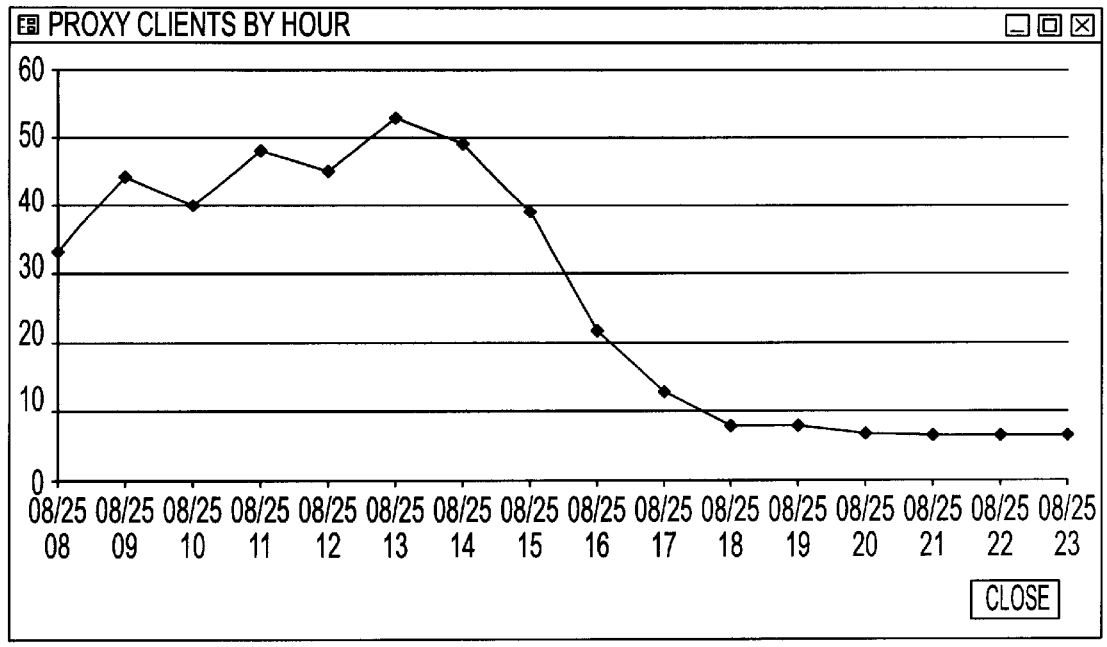
FIG. 20 is the PROXY CLIENTS BY THE HOUR graph which displays the number of users using the proxy server.
FIG. 21 is the ZOOM PROXY LOG button which displays the menu used to generally investigate the proxy filter log.

The PROXY CLIENTS BY THE HOUR graph (See FIG. 20) displays the number of users using the proxy server versus the Date/Hour.

The Daily Summary Report details the Proxy Server Usage Statistics. These include; Total Hits by All Clients, Hits Serviced by Proxy Cache, Proxy Filter Hits, Unique Sites Visited, Unique Client Machines Using Proxy, Total Bytes Received Through Proxy, and The Top 15 Sites Visited During the Period. Although the illustrations in this document show a task manager, this feature is no longer required and will be removed from the Proxy Server Analysis application.

The ZOOM PROXY LOG button (See FIG. 21) is used to display the menu used to generally investigate the proxy filter log. The Start Date/Time and the End Date/Time automatically default from the Proxy Server Analysis menu (FIG. 12). The Client MASK is used to filter for a certain IP address or range of addresses. Wildcard characters (*,?) can be used in this field to facilitate this. The URL MASK is used to filter URL information in the same manner as the Client MASK is used. In both cases, the Filter must be turned on using the On button to the left of the Refresh button. Once the criteria are selected, the Refresh button must be clicked to refresh the content in the display.

Figures 22, 23:
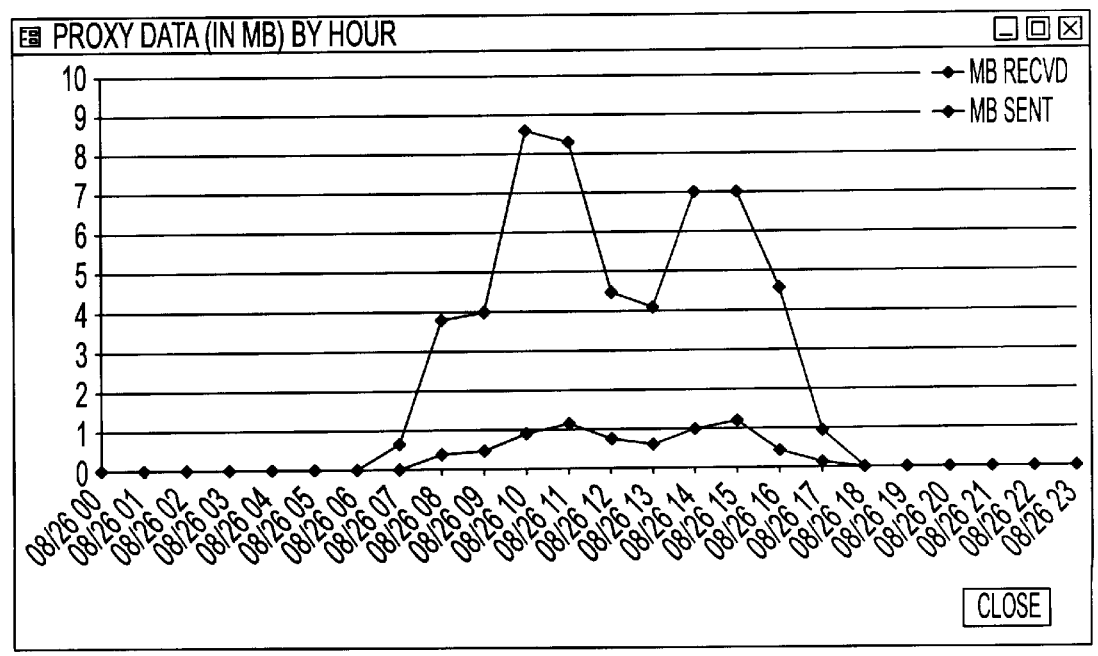
FIG. 22 is the IP INVENTORY MAINTENANCE function which is used to catalog specific IP addresses with the location of individual machines on the network.
FIG. 23 is the PROXY DATA BY THE HOUR graph which displays the number of megabytes of data sent and received by the proxy server.

The IP INVENTORY MAINTENANCE function (FIG. 22) is used to catalog specific IP addresses with the location of individual machines on the network. This database is used by the Zoom Proxy Log display (See FIG. 17) to display the machine identification rather than the IP address of a user being researched. The IP address, machine name, location, normal user, and comments can be entered into this database.

The IP inventory is only necessary when static IP addresses or long term leased DHCP IP addressing is used. In the case of Microsoft Windows NT authenticating security on usernames and passwords, this database is unnecessary. The use of Microsoft Windows NT security as a primary domain controller (PDC) allows the username to be displayed on the Zoom Proxy Log display.

The PROXY DATA BY THE HOUR graph (FIG. 23) displays the number of megabytes of data sent and received by the proxy server versus Date/Time. These numbers do not reflect the data responded to by the cache, therefore, total data transfer for the system cannot be determined with this graph, only actual data transmitted or received from the Internet Service Provider.

The QUIT button closes module 2, the Proxy Server Analysis application.

Proxy Server Analysis (module 2)

The primary philosophy of the current invention is to involve the educator in managing appropriate material in the classroom. Module 1 provides notification of possible activity in fringe areas of inappropriate material and module 2 provides the investigation tools for personnel to research exactly what activity has transpired on their Internet connection, thus allowing appropriate action on the educator's part.

Module 2 is a Microsoft Access 97 application. Its' purpose is to query the proxy server log file to present the Internet activity in a useful manner to educators.

The system uses a "Filter List" as its foundation. The list is designed only to filter obviously offensive material; hence it can be easily circumvented. The filter list is inclusive enough that it will most likely block attempts by the inadvertent user to access inappropriate material, however, focused attempts by a determined user to get through any filter list will inevitably succeed. Said invention deals with this shortcoming by having the ability to notify persons in authority when there are deliberate attempts to get past the filter list. These notifications take the form of e-mail or pop-up windows/messages at the administrator's work station. The notifications are triggered by a statistical analysis.

The theory of using statistical analysis relies on the assumption that, on average, each proxy user will hit the filter from time to time and that a user who is actively seeking inappropriate material will hit the filter a disproportionately larger number of times relative to the average user.

Average Hits/User Algorithm

The proxy server records in a log file each access made by a proxy server user. The present invention inspects a number of these proxy server activity log records picked from a time frame determined by the system administrator. For example, if the system administrator defines the time frame as 15 minutes, said invention would inspect a selection of records representing 15 minutes of proxy server activity. The number of times each proxy user was denied access to any site (a filter hit), is then totaled. The total number of users is then divided into the total filter hits for the time period and an average hits/user is determined. The present invention then calculates the average numbers of hits per user and triggers a notification if a single user exceeds this figure by a predetermined multiplier as set by the slider bar.

Average Hits/Minute Algorithm

Figure 10:
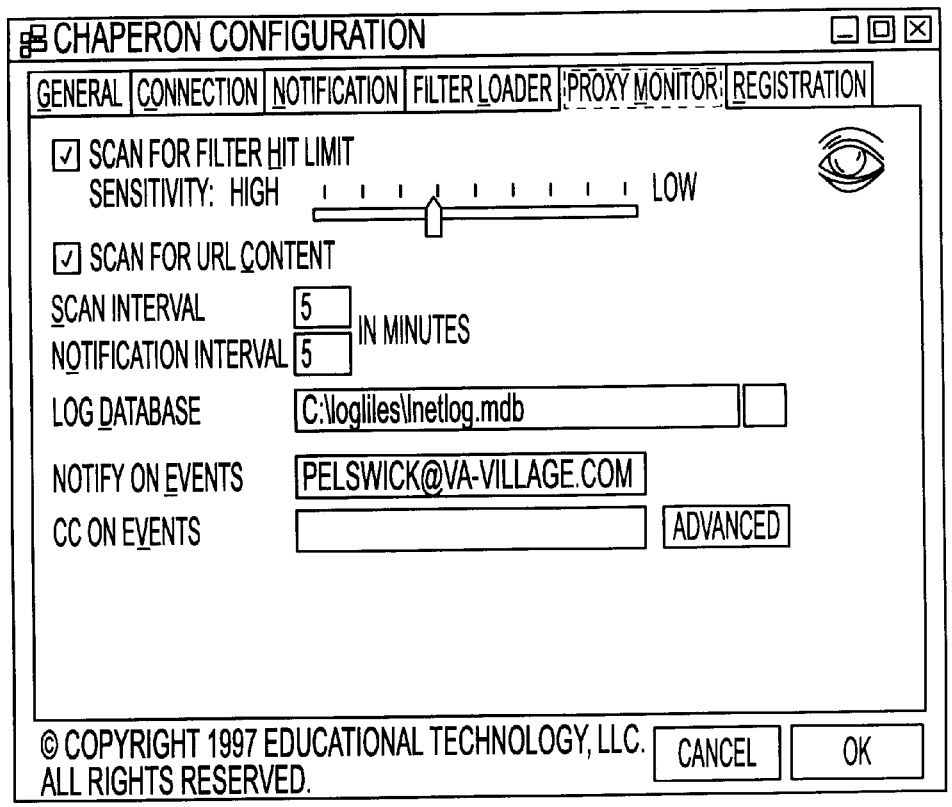
FIG. 10 is an illustration of the proxy monitor tab which displays configuration information about the monitoring functions of the proxy monitor.

When the use of the program is just beginning with very few users, a small number of filter hits, or a near zero running average the above algorithm could be unreliable. Therefore another trigger for a notification message is to use the slider bar value to specify a number of hits per minute. Because the number of filter hits per minute would be set by the same slider bar (See FIG. 10), the number of filter hits to trigger a notification will be in proportion to the percentage multiple that the slider sets for the averaging method. The program takes the number of filter hits per client for the scan internal and divides it by the number of minutes in the scan interval to get a number of hits per minute per client. If this hit rate is higher than the slider bar value, a notification is sent. This message generation technique is useful when the program first starts and has yet to determine an average baseline. At the default setting, the slider bar value would be approximately 4 hits per minute. This is high enough as to prevent accidentally triggering on anyone but the most determined user (i.e. For a 15 minute scan interval, it takes 60 filter hits to trigger a notification, this large of a number would be unheard of for inadvertent hits). The program flushes the baseline average at about 1:00 am. In most school settings, anyone using the computer during this time frame would be one of a very few users (hence the averaging method wouldn't work anyway) and very likely is a user determined to find inappropriate material anyway.

URL Scanning Method

In addition, each and every proxy server log record is inspected and compared against the contents of the URL with a list of words, phrases, and patterns. If the URL contains one or more of the key words or phrases or matches one of a list of specified patterns a notification is sent to the administrator. This methodology is based on the knowledge that users actively seeking inappropriate material will usually begin by using a search engine, such as Yahoo or Excite, to locate the material they are seeking. The words and phrases the user is searching for are relayed to the search engine in the URL (Uniform Resource Locator).

A notification being generated indicates up to three things to administrators: First, as discussed above, the filter is blocking an unusually large number of attempts by a single user as compared to other users. A notification could also mean that the number of filter hits/minute has exceeded a pre-determined level. Finally, in the case of the URL scan notification, the administrator is being informed of a user's intention to find inappropriate material. The notifications include the offending client's location or user name/identification.

The proxy server log analysis tool (module 2) provides the system administrator with the ability to easily isolate and inspect specific proxy user's activity for a selected time frame. This tool is frequently used in conjunction with the notification messages to determine if the user is indeed actively searching for inappropriate material and the frequency and severity of the inappropriate access. Very often, because there is a high probability that inappropriate sites have been accessed that were not blocked by the filter list, the system administrator will be able to identify (and subsequently add to the filter list) additional sites which the user may have gained access to. The proxy server log analysis tool also provides graphs depicting usage of the proxy server in terms of total hits per hour, total megabytes of data (bandwidth usage) per hour, and total proxy clients per hour. Over time, with the use of the proxy server log analysis tool, system administrators are able to quickly identify unusual proxy server parameters, which may indicate an inappropriate use problem.

As previously mentioned, our software focuses on the educator being the decision-maker as to whether inappropriate material is being, or has been accessed, and if so, what actions should be taken. Since educators are in control, their professionalism and traditional democratic processes can be implemented to determine what is appropriate for the classroom. In contrast, conventional methods try to solve the problem without human intervention.

The method and system explained in FIGS. 1–23 operates in conjunction with a filter list. According to another embodiment, the present invention comprises a method and system of creating a filter list. The method and system are explained in conjunction with a known undesirable site and with a chat room. The method and system may also operate with other Internet utilities.

Figure 24:
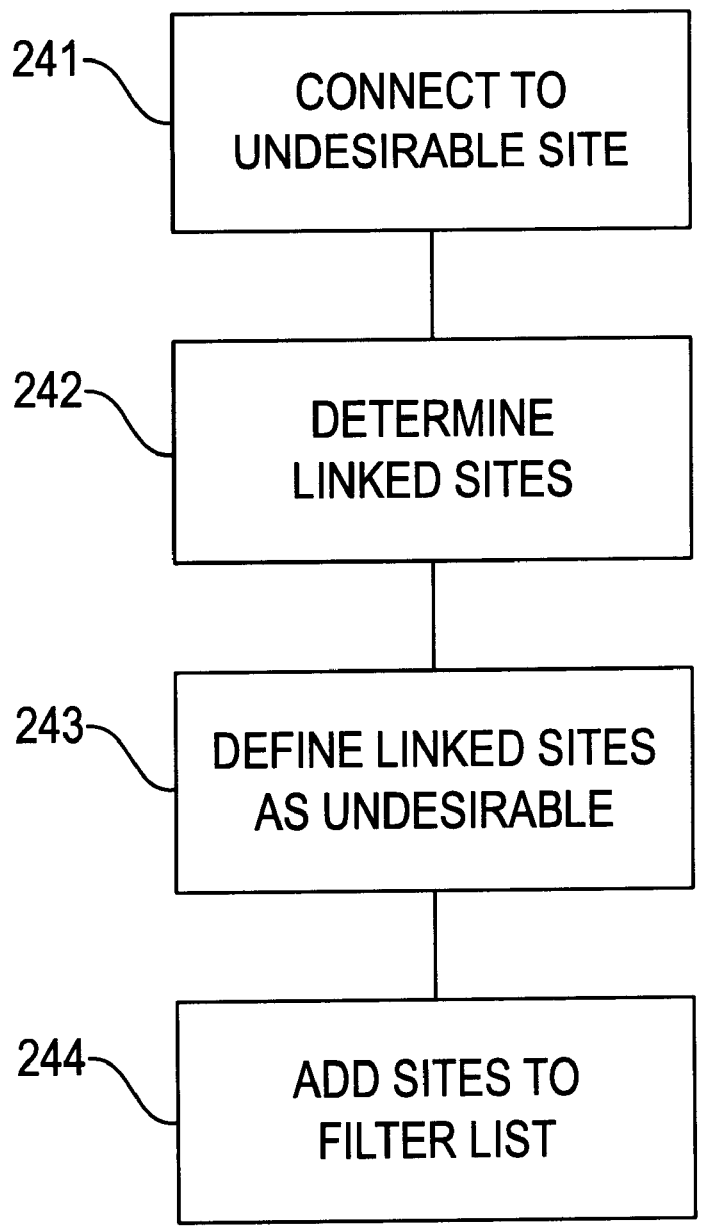
FIG. 24 is a flow chart indicating a method for creating a filter list according to one embodiment of the present invention.

FIG. 24 is a flow chart that illustrates a method of creating a filter list in conjunction with a known undesirable site. The method begins by establishing a connection to an undesirable site (step 241). According to one embodiment, the undesirable site is derived from a filter list, such as is mentioned in conjunction with FIGS. 1–23, and connected to by entering its site address (e.g., its URL). According to other embodiments, the undesirable site may be chosen and connected to in any of a number of conventional ways.

A list of sites that are linked to the undesirable site is developed in step 242. According to one embodiment, the list of linked sites is developed by scanning the undesirable site for all links and adding those links to the list. According to one embodiment, a search algorithm similar to the URL scanning method described above is used. According to this embodiment, instead of looking for undesirable words, patterns such as "http//" are searched for in order to identify all linked sites. Other methods of identifying linked sites are possible.

The determined linked sites are defined as undesirable and added to a filter list in steps 243 and 244 respectively. According to one embodiment, the method of FIG. 24 operates as part of the method of FIGS. 1–23 and linked sites are defined as undesirable sites and added to the filter list already being used. According to another embodiment, the defined sites are used to create a new filter list. Other embodiments are possible.

Figure 25:
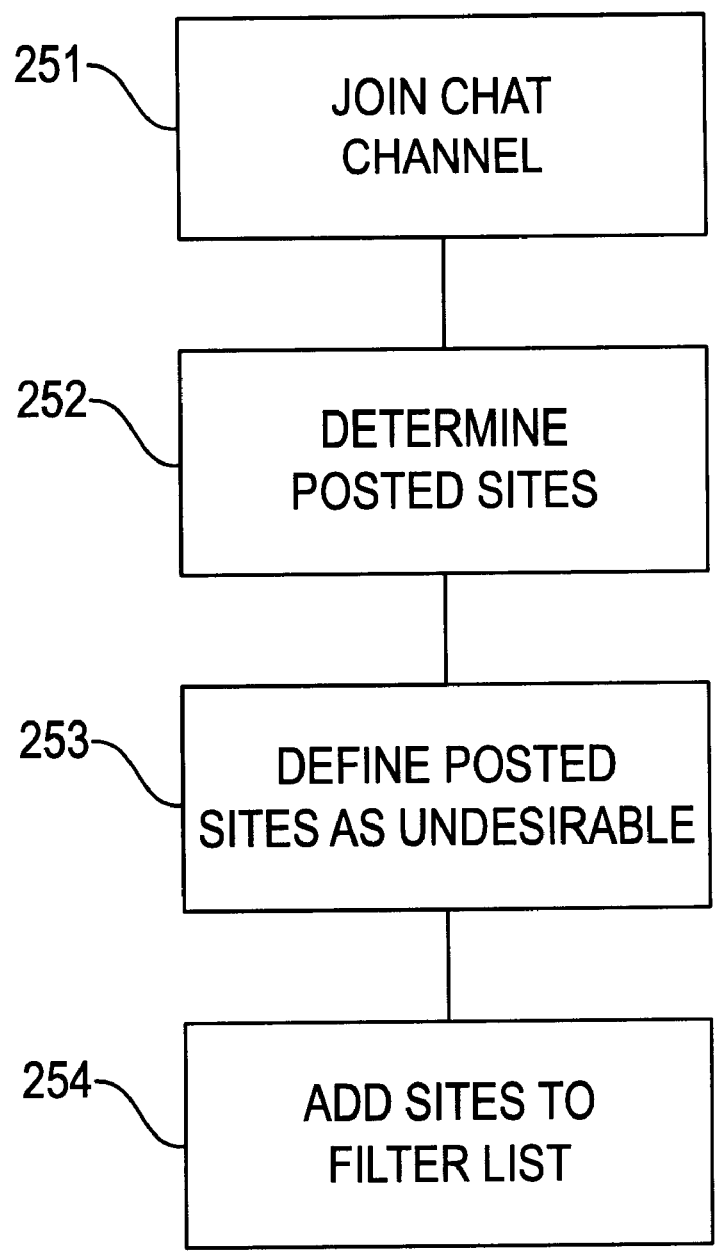
FIG. 25 is a flow chart indicating a method for creating a filter list according to another embodiment of the present invention.

FIG. 25, is a flow chart that illustrates a method of creating a filter list in conjunction with a known undesirable chat room. The method proceeds similar to the method of FIG. 24 and begins by joining a chat room that is known to be undesirable (step 251). According to one embodiment, the undesirable chat room is derived from a filter list, such as is mentioned in conjunction with FIGS. 1–23, and joined to by entering its site address (e.g., its URL). According to other embodiments, the undesirable chat room may be chosen and joined in any of a number of conventional ways.

A list of sites that are posted to the undesirable chat room is developed in step 252. According to one embodiment, the list of posted sites is developed by scanning the undesirable chat room for all posted sites and adding those sites to a list of undesirable sites. According to one embodiment, a search algorithm similar to the URL scanning method described above is used. According to this embodiment, instead of looking for undesirable words, patterns such as "http//" are searched for in order to identify all posted sites. Other methods of identifying posted sites are possible.

The determined posted sites are defined as undesirable and added to a filter list in steps 253 and 254 respectively. According to one embodiment, the method of FIG. 25 operates as part of the method of FIGS. 1–23 and the posted sites are defined as undesirable sites and added to the filter list already being used. According to another embodiment, the defined sites are used to create a new filter list. Other embodiments are possible.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A method for restricting the access of specified network users to specific types of files on a multi-user network; said network including a number of separate network sites comprising the steps of:

a) creating a filter list to establish which network sites should be excluded from access to a specified network user as undesirable;

b) scanning network site identification and location indicia and;

c) directly notifying a system monitor of attempts by said specified network user to access undesirable networks sites.

2. The method of claim 1 wherein the method of creating said filter list includes the further steps of acquiring undesirable site identifiers by entering chat channels and recording every undesirable site identifier posted in said channels for addition to said filter list.

3. The method of claim 2 wherein said method includes the further step of using an automated process to record said site identifiers.

4. The method of claim 2 wherein said method includes the further step of updating the filter list at predetermined intervals by adding identified sites.

5. The method of claim 1 wherein said method includes the further step of reviewing character elements of a target network site indicia to locate character elements which indicate an undesirable network site and preventing access to said undesirable network site.

6. The method of claim 1 wherein said method includes the further step of alerting a system monitor when the number or frequency of attempts by said network user to access undesirable sites reaches a preset threshold set by said system monitor.

7. An automated method of determining undesirable sites for the purpose of creating a filter list of said undesirable sites comprising the steps of:

connecting to a site identified as undesirable;

determining all sites linked to said undesirable site;

defining all said linked sites as undesirable sites and making a record of the identification of said linked sites and;

identifying said linked sites as undesirable in said filter list.

8. The method of claim 7 wherein said method includes the further step of automating the process of determining the identification of said linked sites.

9. The method of claim 7 wherein said method includes the further step of automatically updating the filter list on predetermined intervals using newly acquired identification of said linked sites.

10. An automated method of determining undesirable sites for the purpose of creating a filter list of said undesirable sites comprising the steps of:

a) joining a chat channel identified as involving an undesirable topic;

b) determining all sites posted in said channel;

c) defining all said posted sites as undesirable and making a record of the identification of said posted sites and;

d) identifying said posted sites as undesirable in said filter list.

* * * * *